July 29, 1969     J. A. HOLLY     3,457,587

MOLDING DEVICE

Filed April 17, 1967     2 Sheets-Sheet 1

INVENTOR
JAMES A. HOLLY

BY *Hofgren, Wegner, Allen,*
*Stellman & McCord*

ATTORNEYS.

July 29, 1969  J. A. HOLLY  3,457,587
MOLDING DEVICE
Filed April 17, 1967  2 Sheets-Sheet 2
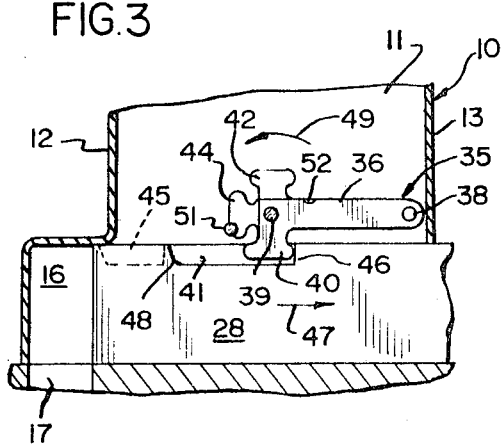
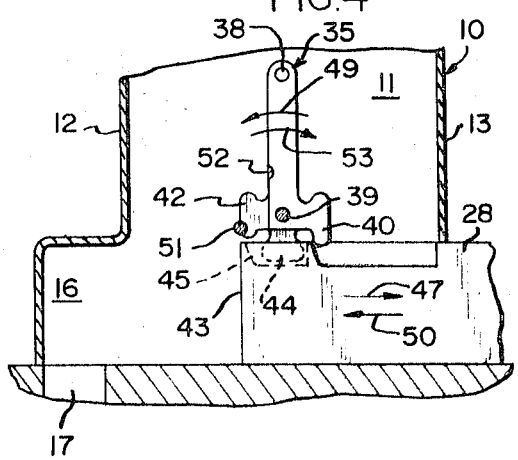
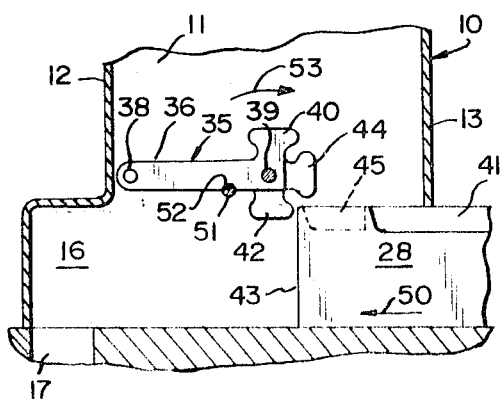
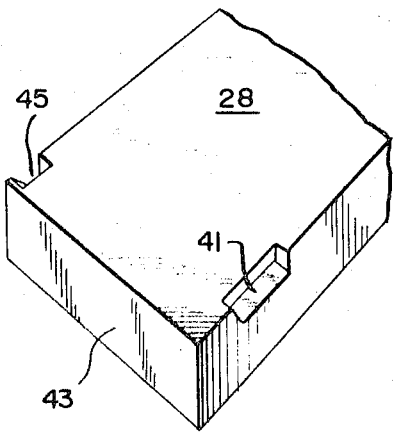
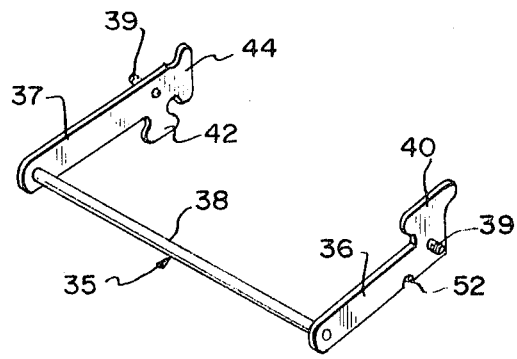

United States Patent Office 3,457,587
Patented July 29, 1969

3,457,587
MOLDING DEVICE
James A. Holly, Olympia Fields, Ill., assignor to Hollymatic Corporation, a corporation of Illinois
Filed Apr. 17, 1967, Ser. No. 631,473
Int. Cl. A22c 7/00; G01f 11/14, 11/18
U.S. Cl. 17—32                                     3 Claims

ABSTRACT OF THE DISCLOSURE

An aparatus for molding articles from plastic material such as patties from ground meat, fish and other food materials in which the plastic material is held in a hopper, a movable feeder in the hopper is periodically movable toward an exit from the hopper to force the material therethrough, an article shaping mold such as a reciprocable mold plate with a patty shaping opening therein is adapted to communicate with the exit to receive material therefrom, an agitator is movably mounted in the hopper for movement through the plastic material therein in order to dislodge the material from adhesive contact with itself and with the inner surfaces of the side walls of the hopper and the agitator being movable toward the hopper exit when the feeder is spaced from the exit, that is, spaced therefrom to aid in maintaining the material in feeding position in the hopper to be engaged by the feeder on movement thereof toward the exit in order that the material will always be in position to be forced by the feeder through the exit.

Cross reference

Applicant's copending application Ser. No. 578,234, filed Sept. 9, 1966, now Patent No. 3,417,425, issued Dec. 24, 1968, and assigned to the same assignee as the present application, discloses and claims a molding apparatus in which a movable feeder is movable in a hopper toward and away from an exit to force plastic material through the exit into an article shaping mold adapted to communicate with the exit. This application, however, does not disclose the agitator of this invention.

Prior issued patents assigned to the same assignee as the present application also disclosing agitators in a plastic material hopper are assignee's U.S. Patents 2,413,046; 2,491,179 and 2,564,064. The agitators of these prior patents, however, are different both in structure and operation from the agitating means disclosed and claimed herein.

One embodiment of the invention is illustrated in the accompanying drawings of which:

FIGURE 3 is a fragmentary vertical sectional view substantially along line 3—3 of FIGURE 1.

FIGURE 4 is a view similar to FIGURE 3 but showing the parts in a further position.

FIGURE 5 is a view similar to FIGURES 3 and 4 but showing the parts in a still different position.

FIGURE 6 is a fragmentary perspective view of the feeder of this embodiment.

FIGURE 7 is a perspective view of the agitator of this embodiment.

Figures 1, 2:
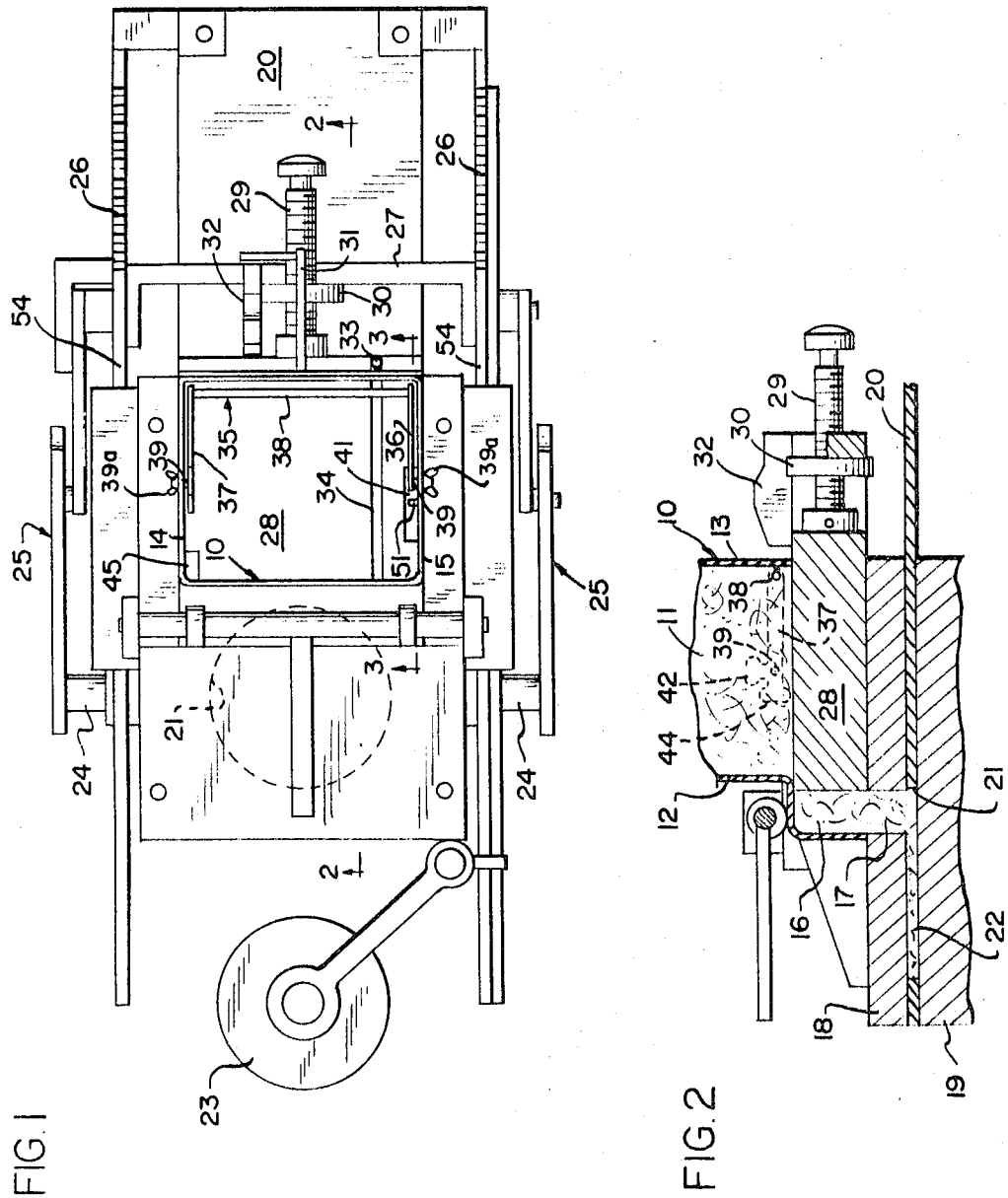
FIGURE 1 is a plan view of a molding apparatus embodying the invention.
FIGURE 2 is a fragmentary vertical section view through the bottom of the hopper and surrounding structure substantially along line 2—2 of FIGURE 1.

The molding apparatus illustrated in the accompanying drawings is for molding patties of plastic food material such as ground meat. The illustrated molding apparatus itself is that disclosed and claimed in the above copending application 578,234 with the addition of the agitator means of this invention. For that reason only enough of the structure of the molding apparatus itself is shown to illustrate the invention.

The molding apparatus shown in the accompanying drawings comprises a hopper 10 adapted to retain a supply 11 of plastic material such as food material of which ground beef is a good example. This hopper 10 is provided with front 12, rear 13 and opposite side walls 14 and 15 having inner surfaces that are in contact with the contained plastic material 11.

At the bottom of the front wall 12 there is provided a forwardly extending front cavity or chamber 16 beneath which is located an exit 17 in the form of an opening through a top retaining plate 18 between which and a bottom retaining plate 19 a mold plate 20 is reciprocated. As shown in FIGURE 2 when the mold plate 20 is in retracted position a mold opening 21 is in position to receive plastic material forced from front chamber 16 and through the exit 17 to form a plastic material patty 22.

As is explained in detail in the above copending application, the mold plate 20 is reciprocated between the position of FIGURES 1 and 2 where the opening 21 is in position beneath the hopper 10 to receive plastic material therefrom and an extended position (not shown) where the mold opening 21 is beneath a knockout ring or inverted cup 23 which is lowered in timed sequence into the extended opening 21 to dislodge the formed patty 22 therefrom. Because the apparatus for moving the mold plate 20 and the knockout ring 23 and the operating means therefor form no part of the present invention they are not illustrated herein detail but reference may be had to the above prior application which is specifically incorporated herein by reference.

As is explained in the above copending application the reciprocating of the mold plate 20 between its above described extreme positions is achieved through motor driven drive means including a motor shaft 24, a pair of hinged linkage systems 25 and a first pair of side racks 26 and a second pair of side racks 54 thereabove. Interconnecting these parallel side racks 54 at the rear is a cross bar, also as explained in the copending application, which is adapted to reciprocate a reciprocable feeder ram 28 by means of an adjustable bolt 29 and nut 30 arrangement that is periodically latched in forward position by a latch 31 that is arranged to be released in proper timed sequence by a release cam 32 mounted on the cross bar 27 for movement therewith.

With this structure (which is described in detail with other cooperating parts not shown here and claimed in the above copending application) the apparatus provides a system in which as the mold plate 20 is reciprocated from its rearmost position as shown in FIGURES 1 and 2 to a forward position where the mold opening 21 is beneath the knockout ring 23 the feeder 28 is reciprocated from its forwardmost position of FIGURES 1 and 2 to its rearmost position as illustrated in FIGURE 5. This, of course, provides periodic filling of the mold opening 21 to form a flat cylindrical patty and removal of the patty from the mold opening by the ring 23.

The feeder 28 is guided in a straight line path of reciprocation by the side walls 14 and 15 and by an external pin 33 on the rear wall 13 which engages an upwardly opening groove 34 in the top surface of the ram 28. Located within the hopper 10 is an agitating means 35 in the form of a bail shaped agitator of generally U-shape with one side 36 adjacent the inner surface of a hopper side wall 15, the other side 37 adjacent the inner surface of the other side wall 14 and a cross member 38 that is adjacent the rear wall 13 when the feeder 28 is in its forwardmost position as shown in FIGURES 1–3 and is adjacent the front wall 12 when the feeder 28 is in retracted position as shown in FIGURE 5.

Thus, as is illustrated in FIGURES 1–5, the agitator 35 is pivotally reciprocated through an arc of about 180° during reciprocation of the feeder in its straight line movement. In order to permit this arcuate reciprocation the agitator 35 is mounted within the hopper 10 on outwardly extending pins 39 that extend through the side walls 14 and 15 of the hopper and are releasably retained therein by threaded wing nuts 39a.

In order to reciprocate the agitator 35 in timed relationship with the reciprocating feeder 28 there are provided in this embodiment interengaging means on the feeder 28 and the agitator 35. In the illustrated embodiment this interengaging means comprises a drive member or first leg 40 extending at right angles to the agitator side 36 and positioned to extend into an elongated cavity 41 in the top of the feeder 28 when the feeder is moved toward and is at its forwardmost position. The opposite agitator side 37 is provided with a second leg 42 that also extends at right angles but in a direction opposite to that of the first leg 40. This second leg 42 is adapted to be engaged by the forward end 43 of the feeder 28 in a manner to be described hereinafter.

There is also provided a third leg 44 aligned with the agitator side 37 but extending in the opposite direction from the pivot pin 39 that is at the end of the agitator side 37. This third leg 44 is adapted to engage a top opening cavity 45 also in the upper surface of the feeder 28 but on the side thereof opposite the side containing the first cavity 41.

With the above arrangement the operation of the agitator 35 is as follows.

As explained earlier, when the feeder 28 is in its forwardmost position shown in FIGURES 1–3 with the plastic material being forced by the feeder 28 into the patty shaped mold 21 in the mold plate 20 to form the patty 22, the feeder 28 is at the forward end of its path of reciprocation. At this time, as is shown in FIGURE 3, the first leg 40 of the agitator 35 extends into the first cavity 41 and is adjacent the end 46 thereof. In this position of the agitator the cross member 38 of the agitator is adjacent the inner surface of the rear wall 13 and therefore is at one end of the arcuate path of movement of the agitator 35. Then, when the feeder 28 is retracted as indicated by the arrow 47 of FIGURES 3 and 4, the forward end 48 of the cavity 41 contacts the first leg 40 of the agitator and moves the agitator in the direction indicated by the arcuate arrow 49 toward its forwardmost position.

When the agitator 35 is at approximately its vertical position as shown in FIGURE 4 the third leg 44 projects into the second cavity 45. Then, further retraction of the feeder 28 in the direction indicated by the arrow 47 causes the engagement of the second cavity 45 with the third leg 44 to continue the pivotal movement of the agitator 35 to its extreme forward position as shown in FIGURE 5. In this position the cross member 38 is adjacent the inner surface of the front wall 12 and is at its closest position to the hopper exit 17 and to the path of movement of the feeder 28.

When the feeder 28 is then moved forwardly to complete one cycle of reciprocation, as indicated by the arrow 50 of FIGURES 4 and 5, the front wall 43 of the feeder 28 engages the second leg 42 of the agitator and the legs 44 and 40 are engaged in sequence by the cavities 45 and 41, respectively, to return the agitator to its initial position shown in FIGURES 1–3 as indicated by the arrow 53 of FIGURES 4 and 5.

In order to limit the maximum extent of forward movement of the agitator there is provided a stop pin 51 extending inwardly of the side wall 15 that is adapted to be engaged by a notch 52 on the adjacent side 36 of the agitator 35 as illustrated in FIGURE 5.

As can be seen from the above description, the movable feeder 28 is periodically movable toward the exit 17 to force the plastic material 11 therethrough by way of the front cavity or chamber 16. The agitating means 35 is also periodically movable toward this exit 17 as it is moved from the position of FIGURE 3 to the position of FIGURE 5. This invention provides means for moving the agitating means toward the exit when the feeder is not being moved toward the exit as an aid in maintaining the plastic material in feeding position to be thusly forced by the feeder through the exit. Thus in the illustrated embodiment as the feeder 28 is withdrawn from the position of FIGURE 3 to the position of FIGURE 5 preparatory to a new feeding stroke the agitator 35 is moved in the opposite direction to dislodge the plastic material from adhesion to itself and to the hopper wall inner surfaces thereby aiding in insuring that the plastic material will be in position to be acted upon by the feeder during its next feeding stroke.

The agitator of this invention is very effective because in its preferred from, as illustrated in the drawings, it has parts, specifically the agitator sides 35 and 36, that are movable adjacent the hopper side walls to dislodge the plastic material adhered thereto. In addition, it has a further part embodied in the cross member 38 that is moved adjacent the inner surfaces of the front and rear walls 12 and 13 when the agitator is approaching the end of its path of movement as illustrated in FIGURES 3 and 5. Thus, as shown in FIGURE 5, the cross member 38 is closest to the inner surface of the front wall 12 when the cross member is closest to the exit opening 17.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. Apparatus for molding articles from an adhesive plastic material, comprising: a hopper for the plastic material having side walls with inner surfaces to which said plastic material tends to adhere and an exit adjacent a first said side wall; a feeder; means for mounting said feeder in said hopper for reciprocation in a path away from and toward said exit to force said material therethrough; an article shaping mold means for receiving said material through said exit; an agitator having parts thereof adjacent said side walls; means for mounting said agitator in said hopper for reciprocation of said parts toward and away from said exit and adjacent said walls to aid in dislodging adhered said material from said walls and moved said material in position to be contacted by said feeder; and means for simultaneously reciprocating said feeder away from and toward said exit in repeating cycles, and reciprocating said agitator toward and away from said exit and adjacent said side walls, whereby said material is both dislodged from said side walls and forced through said exit.

2. The apparatus of claim 1 wherein there are provided means for hingedly mounting said agitator in said hopper adjacent said feeder reciprocation path, a drive member on said agitator, and means on said feeder engaging said drive member for said simultaneous reciprocation of the feeder and agitator.

3. Apparatus for molding articles from an adhesive plastic material, comprising: a hopper for the plastic material having side walls with inner surfaces to which said plastic material tends to adhere and an exit adjacent a first said sidewall; a feeder; an article shaping mold means for receiving said material through said exit; an agitator having parts thereof adjacent said side walls; means for retracting said feeder from said exit preparatory to a subsequent feeding stroke toward said exit; and means for moving said agitator adjacent said side walls and toward said exit during said retracting of the feeder to aid in dislodging said plastic material from said side walls and into the path of said feeder on said subsequent feeding stroke.

References Cited

UNITED STATES PATENTS

| | | | |
|---|---|---|---|
| 1,208,011 | 12/1916 | Riley | 222—226 |
| 1,444,888 | 2/1923 | Sheldon | 222—245 |
| 2,564,064 | 8/1951 | Holly | 17—32 |
| 3,241,178 | 3/1966 | Bridge | 17—32 |
| 3,354,846 | 11/1967 | Ferrary et al. | 17—32 X |

LUCIE H. LAUDENSLAGER, Primary Examiner

U.S. Cl. X.R.

222—226, 245